United States Patent
Wieland

(10) Patent No.: US 10,666,492 B1
(45) Date of Patent: *May 26, 2020

(54) METHOD AND APPARATUS OF PROVIDING EMERGENCY COMMUNICATION SERVICES

(71) Applicant: Open Invention Network LLC, Durham, NC (US)

(72) Inventor: Martin Wieland, Munich (DE)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,304

(22) Filed: Oct. 16, 2018

Related U.S. Application Data

(63) Continuation of application No. 15/837,330, filed on Dec. 11, 2017, now Pat. No. 10,103,930, which is a
(Continued)

(51) Int. Cl.
*H04L 12/24* (2006.01)
*H04W 84/22* (2009.01)
(Continued)

(52) U.S. Cl.
CPC .......... *H04L 41/026* (2013.01); *H04L 45/745* (2013.01); *H04L 49/351* (2013.01);
(Continued)

(58) Field of Classification Search
CPC ... H04L 41/026; H04L 63/166; H04L 49/351; H04L 51/32; H04L 67/306; H04L 45/745; H04L 63/08; H04W 84/22; H04W 84/12; H04W 4/14; H04W 4/60; H04W 4/80; H04W 12/06; H04W 76/15; H04W 4/90; H04W 88/16; H04W 84/18
See application file for complete search history.

(56) References Cited

U.S. PATENT DOCUMENTS 6,879,574 B2    4/2005  Naghian et al.
7,089,335 B2    8/2006  Aiken et al.
(Continued)

OTHER PUBLICATIONS

Bluendo, "Lampiro Messaging Client", 2008.
Microsoft Corp., "Vine Face Sheet", Apr. 2009.
Yahoo, Inc., "Fire Eagle Documentation", Sep. 2009.

*Primary Examiner* — Ajay Cattungal

(57) ABSTRACT

Disclosed is an electrical device and method of automatically searching for and connecting to known or unknown available public communication infrastructure and/or devices in the vicinity using a multi-layer communication model. Each layer may include binding information for local available communication methods and shareable hardware devices, a routing table, and, if applicable, one or more logon profiles for service providers. Communication layers may be built by searching for available public communication infrastructure and/or devices in the vicinity by actively sending out connection requests to all addressable destinations along the available transport medium. Each node is able to access and use the communication infrastructure of each other node. Switching between layers as they become inoperable and/or become available without any user interaction required is also possible.

20 Claims, 2 Drawing Sheets

Related U.S. Application Data continuation of application No. 15/584,412, filed on May 2, 2017, now Pat. No. 9,843,471, which is a continuation of application No. 15/201,863, filed on Jul. 5, 2016, now Pat. No. 9,642,176, which is a continuation of application No. 14/941,632, filed on Nov. 15, 2015, now Pat. No. 9,386,620, which is a continuation of application No. 14/450,667, filed on Aug. 4, 2014, now Pat. No. 9,191,981, which is a continuation of application No. 12/850,001, filed on Aug. 4, 2010, now Pat. No. 8,797,855.

(51) Int. Cl.

| | | |
|---|---|---|
| *H04W 84/12* | (2009.01) | |
| *H04L 12/931* | (2013.01) | |
| *H04L 12/58* | (2006.01) | |
| *H04L 29/08* | (2006.01) | |
| *H04W 4/14* | (2009.01) | |
| *H04W 4/60* | (2018.01) | |
| *H04W 4/80* | (2018.01) | |
| *H04L 12/741* | (2013.01) | |
| *H04W 12/06* | (2009.01) | |
| *H04W 76/15* | (2018.01) | |
| *H04W 4/90* | (2018.01) | |
| *H04W 88/16* | (2009.01) | |
| *H04W 84/18* | (2009.01) | |
| *H04L 29/06* | (2006.01) | |

(52) U.S. Cl.
CPC ............ *H04L 51/32* (2013.01); *H04L 67/306* (2013.01); *H04W 4/14* (2013.01); *H04W 4/60* (2018.02); *H04W 4/80* (2018.02); *H04W 4/90* (2018.02); *H04W 12/06* (2013.01); *H04W 76/15* (2018.02); *H04W 84/12* (2013.01); *H04W 84/22* (2013.01); *H04L 63/08* (2013.01); *H04L 63/166* (2013.01); *H04W 84/18* (2013.01); *H04W 88/16* (2013.01)

(56) References Cited

U.S. PATENT DOCUMENTS

| | | | |
|---|---|---|---|
| 7,443,833 B2 | 10/2008 | Ayyagari | |
| 7,649,872 B2 | 1/2010 | Naghian et al. | |
| 7,961,735 B2 * | 6/2011 | Takahashi | H04W 88/02 370/395.2 |
| 2003/0202494 A1 | 10/2003 | Drews et al. | |
| 2004/0073642 A1 * | 4/2004 | Iyer | H04L 29/12311 709/223 |
| 2005/0114468 A1 * | 5/2005 | Philyaw | G06F 9/4411 709/217 |
| 2005/0240713 A1 * | 10/2005 | Wu | G06F 3/0613 710/314 |
| 2006/0224883 A1 * | 10/2006 | Khosravi | H04L 63/166 713/151 |
| 2007/0010248 A1 * | 1/2007 | Dravida | H04W 84/18 455/435.1 |
| 2007/0038735 A1 * | 2/2007 | Tsunoda | H04N 1/00127 709/223 |
| 2007/0230421 A1 | 10/2007 | Roadknight | |
| 2008/0145058 A1 * | 6/2008 | Fukae | H04L 25/0262 398/118 |
| 2009/0011834 A1 * | 1/2009 | Chhabra | H04L 67/18 463/42 |
| 2009/0070440 A1 * | 3/2009 | Dion | H04L 67/04 709/220 |
| 2009/0109995 A1 | 4/2009 | Alam et al. | |
| 2009/0249458 A1 * | 10/2009 | Banga | G06F 21/31 726/7 |
| 2011/0039495 A1 * | 2/2011 | Sawai | H04W 52/16 455/62 |

\* cited by examiner

METHOD AND APPARATUS OF PROVIDING EMERGENCY COMMUNICATION SERVICES

TECHNICAL FIELD OF THE INVENTION

This invention relates to communication networks, and more particularly to providing emergency communication services for communications networks.

BACKGROUND OF THE INVENTION

During emergencies it is necessary that family and friends stay connected when certain communication methods are either broken or not particularly efficient. This requires that communication in be as flexible and reliable as possible to keep people connected.

Accessibility to such communication mediums is generally granted via various methods including a desktop software client application, text messaging, email and even voice transmission. Such communications should also be able to gather local news from local and national news sources, and public safety announcements from natural disaster prediction sources, such as, the National Oceanic group and the Atmospheric Administration group.

The user should be able to post status updates to social networks for close friends and family. Reception of such status updates and social network news feeds should be available to let the user see what people are doing, as well as their location on a map if such an application is being shared.

Times of crisis usually involve a breakdown in mobile phone communications and other key communication infrastructures. Failure of electricity and limited accessibility of a person to communicate may also be caused by environmental conditions or personal injuries. Such scenarios usually require at least a working mobile phone or other key communication infrastructure for the user to access in the case of an emergency.

Obviously, a partial lack of access to a key communication infrastructure can be solved by building up a small local area AD-Hoc network where similar network clients may connect to each other as needed, either by cable or via a wireless communication medium.

The military commonly sets up such infrastructures as most of the interest in Ad-Hoc networking has been from the military. Battlefield applications already exist where troops and vehicles are equipped with Ad-Hoc radios. These troops then form a communication network in the ever-changing battlefield environment that is independent from public available communication infrastructure.

Another group of Ad-Hoc networks that is well known from crisis situations has been citizen band radios, which provide efficient simple group voice communication in radio coverage area.

Speech communication in an Ad-Hoc manner for very short connections may be provided by cordless telephones. There are several standards in cordless telephony, both analog and digital. Infrared (IR) connections are widely used in remote controllers, and in peer-to-peer connections between mobile phones, PDA's and laptops. IR provides a simple and easy way to communicate between compatible nodes in very short connections.

For data transmission, remote controls can also utilize a radio connection for example a radio "key" that can be used for a car or a door. Computer keyboards and mice also can be connected via, typically proprietary radios for each application. For speech and data transmission, a Bluetooth radio connection has been developed especially for mobile devices to connect to their short-range environment. Bluetooth is used mainly for single hop connections where devices automatically form a master-slave point to point network. Such networks can be multi-layered so that a slave may operate as a master for other slaves. Communication happens mainly between master and slave. Communication between two slaves happens via common master.

Wireless local area networks also are capable of operating in an Ad-Hoc manner basically with single-hop connections between similar nodes. A typical construction of such a network includes access points that are connected to a network and wireless network interface cards in nodes. This technology supports also peer-to-peer communication mainly for data transfer directly between nodes.

The application market includes such tools as Yahoo's Fire Eagle® service, which, for example, discloses and covers a method to broker location information. It includes functions to share information about a device location with sites, services and other network clients. The method allows transmission and reception of information about a devices location to and from a central platform. Data exchange may be done by various types of devices and operating systems, such as, computers, mobile phones and GPS devices. However, this method presupposes a working accessible connection to a communication infrastructure from the participating device. Initial build up of such a connection based on local available access points or usage of communication methods other than packet oriented network protocols is not provided by such a communication method.

Microsoft's "Vine"® communication platform provides a similar set of functionalities including methods to send alerts and receive reports from a defined group of devices. Communication may include reception of region specific messages and public safety announcements from government officials and transmission of alerts to such authorities. The solution allows the setup of a defined group of devices built from available profiles. To the user, such a group appears as a virtual local area network. Although the application conveys the impression that it provides a safety network in the case of crisis situations, it requires an accessible broadband Internet connection, valid logon information for such a connection, and a personal computer with a manufacturer specific setup. In a real crisis situation, it is unlikely that all such requirements will be satisfied.

The open source messaging client "Lampiro"® effectively creates a "morph" procedure that "morphs" mobile devices into terminals that provide a functionality similar to "thin" clients. The application allows the control of remote peripherals, and through menus and wizards, interaction with applications and services running on a remote server. The application utilizes a manufacturer specific communication protocol that is located on top of the primary communication layer of the device. The application acts as a universal client, which interacts with a remote server. Although the application introduces an additional communication layer that adds extended functionality to the device, an operational access to public communication infrastructure is required which allows usage of the layers functionality.

A method for bridging multiple network segments and exposing the multiple network segments as a single network to higher-level networking software on a bridging computing device, is described in U.S. Pat. No. 7,089,335. Although this method discloses a technique that can be used to guarantee a functioning access to public communication infrastructure even if one of multiple network connections fails, it also requires at least one working connection between the involved communication devices.

U.S. published patent application No. 2003/0202494 discloses a method, a system or an apparatus that allows establishment of an Ad-Hoc network utilizing a node and a plurality of nodelets. The application describes a technique to build-up a virtual connection from a first device to a second device, however, due to different communication standards of both devices, direct communication between the devices is not possible. In operation, devices in the vicinity of the first device that comply with the communication standards of the first device may receive and forward data to other nodelets. Although this disclosure discusses building a connection between incompatible devices, at least one accessible device is still needed to initiate the process for building up the connection to the second device.

Both U.S. published patent application No. 2005/0153725 and U.S. Pat. No. 6,879,574 disclose a method that includes a node that acts as a gateway between a backbone access network (e.g. WLAN, cellular, mesh, etc.) and "child" terminals of a corresponding Ad-Hoc cell or subnet. One node acts as a gateway between the nodes within the Ad-Hoc domain and the backbone access network. The node may be elected to be the gateway by the trunk node itself or by a resource management entity. These references provide selecting from available communication layers and switching the active communication layer based on various criteria and rule sets. Although these references already discloses a multi-layer architecture, an initially accessible connection between the devices that form a communication layer is still required.

Patent application publication No. 2007/0230421 discloses a method of operating an Ad-Hoc network that contains a plurality of devices each of which stores information which specifies rules for determining how a device should behave in response to various prevailing circumstances. Instead of building a separate communication layer for each device this method builds-up and maintains a database that contains information about connected devices, their capabilities, settings and performance. Although the ability to remember and exchange logon and routing information between devices makes it possible to share logon profiles that allow access to a public communication infrastructure, the reference does not disclose how this information should be gathered if neither the configuration nor the communication abilities of the target device are known.

A software architecture that provides Ad-Hoc wireless networking capabilities, user and kernel mode modules, and a multiplexing driver framework that enables connection to multiple Ad-Hoc networks is disclosed in patent application publication No. US 2009/0109995. The disclosure describes methods to discover wireless networks and already contains a multi-layer communication architecture which allows simultaneous connections over a single physical adapter and bridging of such connections. The method provides a way to connect a single physical existent network adapter with multiple virtual adapters via a multiplexing driver. Although this method permits bridging multiple concurrently active virtual network adapters using one physical adapter, the newly created low level multiplexing driver requires additional frame headers to function properly.

Another method for performing in an Ad-Hoc network configuration is disclosed in U.S. Pat. No. 7,443,833. In this reference, prior to establishing a connection to a node a condition is defined to be associated with such nodes. In case the specified condition occurs, the method utilizes a dedicated, contention free, discovery-communication time period during which each node broadcasts, for reception by all other nodes, its attributes, including its identity, its operating characteristics, its capabilities, and its associated link qualities in relation to the other nodes. The reference utilizes the results of the exchange process to create and make available to all nodes, an overall network topology map associated with the nodes. Although this disclosure shows a way to create a network topology with initially unknown nodes, the method is based on a predefined set of rules that has to be known and obeyed by all potential nodes prior to establishing a connection. In addition, the defined condition limits the result of the discovery process to nodes that meet the condition.

All of the above-noted references disclose networking configurations that provide limited accessibility and/or stringent conditions imposed on the various communication devices operated by the end users. Device connections need to be seamlessly combined with past, current and possible future network infrastructures in order to guarantee service provisioning for end users and to maintain communication in the event of a crisis.

SUMMARY OF THE INVENTION

Example embodiments of the present invention may include a method of transmission of data packets from or to an electrical device according to a packet data service in a wired or radio network which is provided for data transmission and in which at least one primary communication channel for transmission of at least one data packet from or to the electrical device is set up in a transmission system of the network, via at least one additional communication channel, and the additional communication channel is established by the electrical device. The method may include searching for at least one of an available public communication infrastructure and devices in a corresponding vicinity by actively sending out connection request packets to all addressable destinations via an accessible transport medium. The method may also include connecting to responding destinations by exchanging a set of predefined logon information.

Example embodiments of the present invention may include an apparatus device configured to transmit data packets from or to an electrical device according to a packet data service in a wired or radio network which is provided for data transmission and in which at least one primary communication channel for transmission of at least one data packet from or to the electrical device is set up in a transmission system of the network. The electrical device may include at least one processor that, when loaded with computer-readable instructions, executes the instructions to build up an additional communication channel at the electrical device. The electrical device may also be configured to search for at least one of available public communication infrastructure and devices in a corresponding vicinity by actively sending out connection request packets to all addressable destinations via an accessible transport medium, and connect to responding destinations by exchanging a set of predefined logon information.

DETAILED DESCRIPTION OF THE INVENTION

Figure 1:
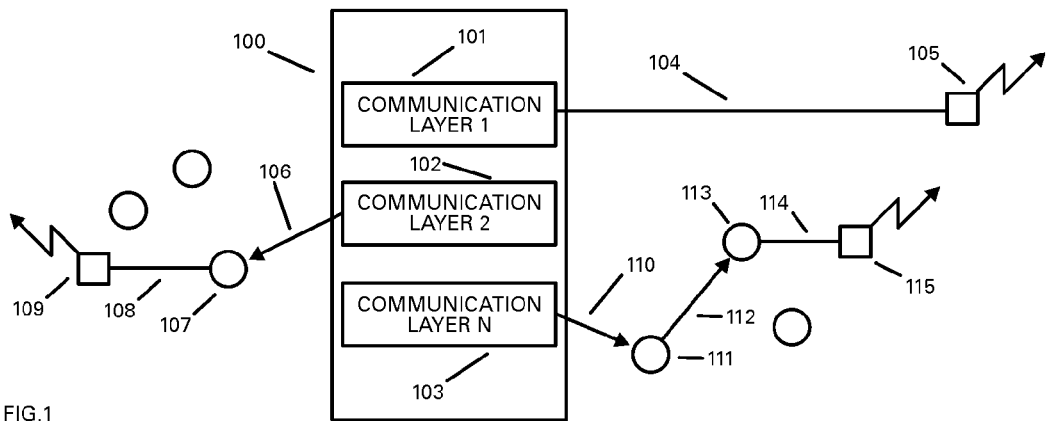
FIG. 1 is a block diagram of an exemplary operating environment, according to example embodiments of the present invention.

The present invention is directed at addressing the mentioned shortcomings, disadvantages and problems, and will be understood by reading and studying the following specification. The invention may be more vividly described with reference to FIGS. 1-6.

Access to the various communication networks already in place is an ongoing struggle for the communication devices available today. Other concerns for maintaining communication may include how to deal with the failure of electrical power sources. In addition, it is likely that the specific service provider of a mobile phone may not be accessible due to overloading of the communication lines. Another ongoing dilemma is how devices that work on different communication standards (i.e., technology, frequency, network protocol, etc.) can communicate together to form a network, either Ad-Hoc or other type of communication scheme.

Ideally, a mobile station would be configured to have a technique that may be used to explore devices in a given vicinity, identify the communication technologies being employed by the mobile stations of that given vicinity, and morph the configuration of the mobile station to fit into the profile accessible to the nearest network. Such a configuration process may include the setup of an independent communication layer, which may be based on the gathered information from the identification procedure.

The process of actively identifying a network configuration protocol and related communication standards and creating that particular communication layer based on the identified standards has not been established by any vendor. Example embodiments of the present invention disclose a method to create and switch between communication layers which are bound to different physical network adapters.

In operation, an electrical device, such as, a mobile station automatically searches for and connects to known or unknown available public communication infrastructure and/or devices in the nearby vicinity using a multi-layer communication model. Each communication layer may include binding information for local available communication methods and shareable hardware devices, a routing table and, if applicable, one or more logon profiles for service providers.

As a device (i.e., mobile station) builds communication layers, it searches for available public communication infrastructure and/or devices in the vicinity by actively sending out connection requests to all addressable destinations reachable via the present transport medium (i.e., wireless networking). The device may connect to responding destinations and spontaneously builds a local area network (LAN) for the layer with devices found in the vicinity. The nodes of the LAN dynamically exchange layer specific information and share their resources with other nodes. Each node is able to access and use the communication infrastructure of each other node. In addition, the communication layers may be switched between to allow the device to switch between the layers as they become inoperable and/or available without any user interaction required.

One example method of the present invention allows an electrical device, such as an analog telephone, an ISDN telephone, a radio device, a cell phone or a personal computer, to automatically search for and connect to available public communication infrastructure and/or devices in the nearby vicinity by using a multi-layer communication model. The multi-layer communication model operates in wired and wireless environments and supports connections to known and unknown service providers as well as interconnections between devices that ordinarily are incompatible with each other due to different communication protocols, frequencies or even transport media.

Each communication layer includes binding information for local available communication methods. The communication layers may also include shareable hardware devices, a routing table and, if applicable, one or more logon profiles for service providers. In operation, a visiting device would build communication layers by searching for available public communication infrastructure and/or devices in the nearby vicinity by actively sending out connection requests to all addressable destinations of the transport medium. The device would then connect to responding destinations and spontaneously build a local area network for the communication layer with devices found in the vicinity.

The nodes within the local area network dynamically exchange layer specific information and share their resources with other nodes. Each node is able to access and use the communication infrastructure of each other node. The device would be capable of switching between layers as the layers are inoperable and/or become available without any user interaction required.

FIG. 1 is a schematic diagram of an electronic device 100 which is already equipped with multiple communication layers. The diagram shows the implementation of various aspects of the invention. The electronic device is connected to a point-to-point network 104 via its primary communication layer 101. The "communication layer" is used for simplification and represents a unit including information for local available communication methods such as network adapter, network client, network service, network transport and, if applicable, shareable hardware devices, a routing table, and one or more logon profiles for service providers.

The electronic device 100 can access public communication infrastructure or other networks by connecting to the node 105 of the point-to-point network. This node usually processes authentication, identification, localization, encryption or data service information, and, after successful authentication of the electronic device acts as a router. This configuration can be found in most common electronic devices that are used for communication purposes. In case of an analog telephone the primary communication layer does not send or receive authentication information. It simply identifies its network by a cable. This cable leads to a regional switching unit that performs the requested routing tasks.

In case of an ISDN telephone the electronic device is equipped with an additional piece of hardware that is supplied by the service provider and which performs authentication and identification. If the device is a cell phone, after powering on the device, the primary communication layer searches for available nodes in the vicinity, presents them to the user, and, after selection of one node, exchanges authentication information with this node, and, if successful, allows routing to other devices. Personal computers are usually connected to a cable which may already be part of a network.

Access to public communication infrastructure or other network nodes from the personal computer requires successful authentication with a special node defined by the service provider. In operation, a device first connects to one node in the form of a point-to-point communication. The node then provides routing capabilities for the device. If this initial connection cannot be established, access to public communication infrastructure or other network nodes is impossible. The usage of additional communication layers overcomes this limitation. A secondary communication layer 102 connects to a device 107 in the vicinity. The connection 106 can either be made by wire or wirelessly.

The device 107 already has an established connection 108 to a node 109 that allows routing to public communication infrastructure. As the device 107 is already setup to allow routing between its communication layers, the device 100 is able to access public communication infrastructure via the node 109 that is used by the device 107 to access public communication infrastructure.

Routing between communication layers also allows access of the public communication infrastructure by usage of more than one hop. Communication layer 103 may have a connection 110 to device 111. Unfortunately, this device does not have access to a router 115, but allows local routing between its own communication layers. As device 111 already has an established connection 112 to device 113, and device 113 also allows local routing, all three devices are able to access the public communication infrastructure made available by the node 115.

As the communication capabilities and settings of a device in the vicinity, most likely, are unknown by the device that attempts to communicate, a suitable communication layer has to be established by the primary device.

Figure 2:
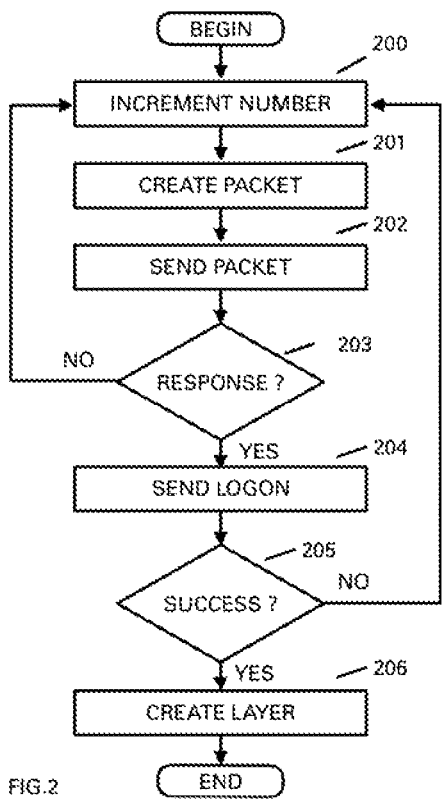
FIG. 2 is a flow chart illustrating a method of creating a communication layer in accordance with embodiments of the present invention.

FIG. 2 is a flow chart illustrating a method of creating such a communication layer, according to example embodiments of the present invention. Initially, the device increments a number 200. The expression "number" means incremental value and depends on the available transport medium at the device. In case of a packet-oriented wired network, the number represents the value of an IP address or a subnet mask. In case of a telephone line, the number represents an information sequence that may either be built in analog or digital form. If the available transport medium is a radio device, the number means frequency.

To establish a suitable communication layer, the device creates a packet 201 and/or sequence, a connection request from the incremented number, and sends 202 it along via the available transport medium. As this process is not performed on the primary communication layer, it does not block or limit the communication capabilities of the device. No response 203 to a connection request leads to creation of a new incremented number followed by creation and sending out of a connection request. A successful response initiates transmission of a predefined logon 204, and authentication information is sent to the responding destination.

As connection attempts to the whole available address range of the transport medium most likely leads to multiple incompatible and/or unwanted responses, the exchange of logon information may be required. The logon information may be fairly simple and comparable to dialing a 9-1-1 call. Failed exchange of logon information would again lead to creation of a new incremented number followed by creating and sending out a connection request. In the case of success, the device creates the additional communication layer 206 which now can be used by the device to communicate.

As the majority of available devices throughout the world are equipped with only one communication interface, which is further limited to communicate with a public communication infrastructure via one gateway at a time, further steps may be necessary to allow the usage of the above-described method with such devices.

Figure 3:
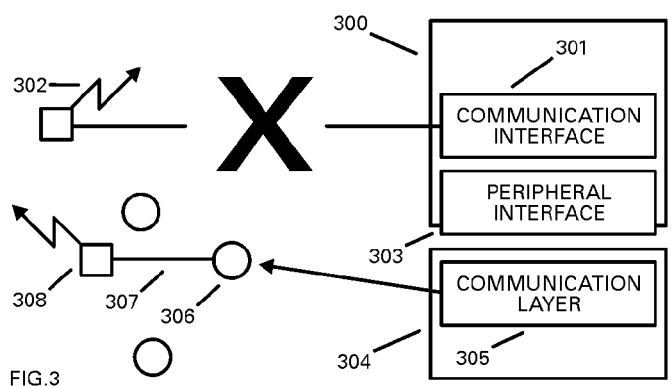
FIG. 3 is a block diagram generally illustrating a device that has a single communication interface, according to example embodiments of the present invention.

FIG. 3 illustrates an exemplary implementation of a communication method when used with a common communication device, according to example embodiments of the present invention. Referring to FIG. 3, the device 300 has a communication interface 301 that, in normal operation, connects via a node 302 which acts as a gateway to a public communication infrastructure. Due to the fact that these conventional devices have a peripheral interface 303 which allows it to be plugged into a peripheral device, it's possible to build a required communication layer 305 on such a device.

Different peripheral devices with different communication interfaces can be used to establish a required communication layer. For example, a primary device with a communication interface that permits communication in a narrow frequency band can be equipped with a peripheral interface that supports access to a packet-oriented wired network and/or an ISDN telephone can be equipped with a peripheral interface that allows access to a mobile radio network. For both examples, the added peripheral device would search for a device 306 in the vicinity that has a connection 307 to a public communication infrastructure via a gateway 308 and add an additional communication layer that allows access to a public communication infrastructure from the primary device via the layer 305.

Figure 4:
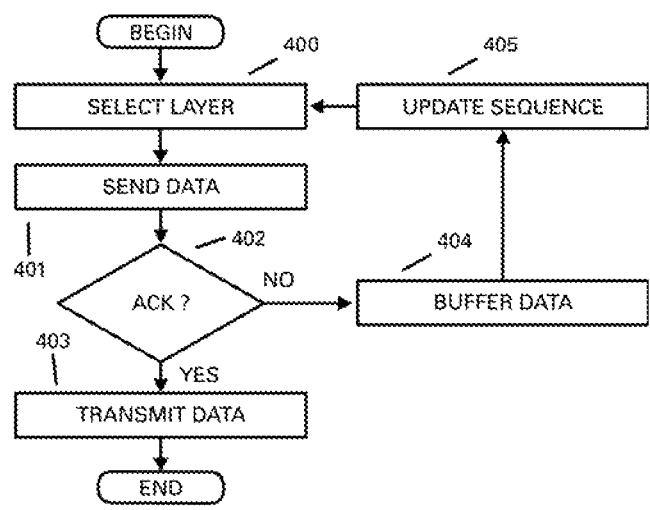
FIG. 4 is a flow chart illustrating a method of switching between communication layers as they become inoperable or become available, according to example embodiments of the present invention.

FIG. 4 is a flow chart illustrating a method of switching between communication layers as they become inoperable and/or become available, according to example embodiments of the present invention. In general, communication layers behave similar to multiple network interfaces with possibly different network transports. As common devices connect to nodes that reside outside of a local area network via one defined gateway, any additional communication layer may be subsequently added to a list of available communication interfaces such that the rank of each layer inside the list defines its corresponding gateway metric.

The communication layer creation process creates additional communication layers according to the characteristics of devices found in the vicinity. Communication layers may become inoperable and/or become available, also maintenance of the communication layers may be required. In case the primary communication layer is working for additional layers this task can be seamlessly performed in background without interruption to the user's service. Even if the primary communication layer is in use and becomes inoperative, this task can be performed with minor disturbances.

To define the metric of the layer, the device selects the layer 400 and sends data 401 to the node that was taken as the basis for creation of the communication layer (see procedure according to FIG. 2). If the node is accessible 402, the device transmits data 403, and, if applicable, performs this task on additional layers. If the node is not accessible, the device buffers 404 potentially existent payload data, updates the list of available communication layers, selects the communication layer from the modified list and repeats the process.

Figure 5:
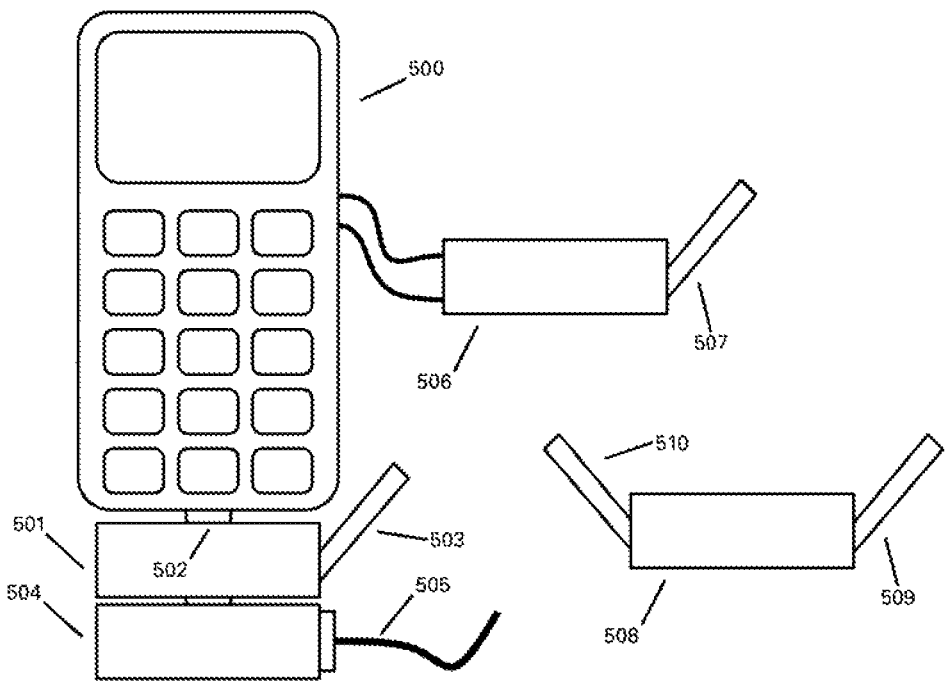
FIG. 5 is an exemplary illustration generally representing locations for placement of an auxiliary peripheral device that provides additional communication layers for a mobile device such as a cell phone or a mobile PC.

FIG. 5 illustrates an exemplary illustration representing locations for placement of one or more auxiliary peripheral devices, according to example embodiments of the present invention. Referring to FIG. 5, the auxiliary peripheral devices provide additional communication layers for a mobile device 500 such as a cell phone or a mobile PC. There are many varieties of devices that can serve as an auxiliary peripheral device for a primary electronic device. For example, some devices can connect to the electronic device via a hardwired connection 502 such as a USB connection. The wireless device 508 connects to devices in the nearby vicinity (ad-hoc, piconet, LAN, etc.) as well as to public available communication infrastructures via wireless protocols.

FIG. 5 illustrates a device 508 that is equipped with an antenna 510 to communicate with a local area network as well as with an antenna 509 for access to wide area networks. As shown in FIG. 5 "smart" mobile phones and pocket-sized computing devices provide reasonably good peripheral interfaces and may be already configured to connect to and utilize additional peripheral devices. FIG. 5 illustrates multiple auxiliary peripheral auxiliary devices that are connected to a primary electronic device. Such devices may come in form of an "emergency communication services kit."

Device 501 is equipped with its own antenna 503 that searches for and provides access to other wireless devices in the vicinity of wireless networks such as cellular, wireless local area networks or even a citizens band radio. Connections may be established to the primary electronic device via a hardwired connection 502. In case of an USB connection, such devices may be presented on the primary electronic device as a simple mass storage device. Device 504 represents another peripheral device that is also connected to the primary electronic device, but unlike device 501, device 504 searches for and connects to available wired devices in the vicinity via a cable 505.

Primary electronic devices that do not have such modern peripheral interfaces may also be equipped with an auxiliary peripheral device by connecting it to any available input/output connector. For example, the peripheral device 506 which is equipped with a separate antenna may be connected to an audio input and output of the primary electronic device.

Figure 6:
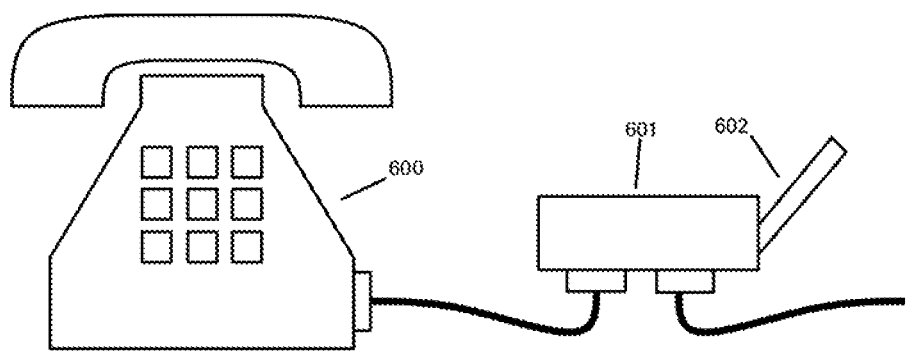
FIG. 6 is an exemplary illustration generally representing a location for placement of an auxiliary peripheral device that provides additional communication layers for an electrical device such as an analog telephone.

Referring to FIG. 6, other devices, such as, analog telephones 600 are more limited as they do not have additional peripheral interfaces at all and usually only provide a single interface for communication. In such case, an intermediary external device 601 can be used that, on one side acts and may be contacted as an additional branch of an existing telephone system, whereas on the other side it searches and connects to devices in the vicinity or public available communication infrastructure via wireless 602 or wired (not shown) connections.

If equipped with an alternate energy source such as a battery or an accumulator, any variant of such additional peripheral device can search for and connect to public available communication infrastructure or devices in the vicinity even when the main device is offline or powered down. A set of limited functionality such as continuous posting of information can also be provided by such an auxiliary device. For example, the device can post details about its current network connection to a predefined target. This information could then allow localization of the geographic position of the device. Even controls such as buttons may be provided to allow the user to interact with the auxiliary peripheral device to initiate various actions, such as, searching for and connecting to public available communication infrastructure or devices in the vicinity or posting predefined alerts in case of emergency.

Even without direct access to any public communication infrastructure from the primary electronic device itself usage of all variants of such additional peripheral devices is straightforward. As soon as the auxiliary peripheral device is powered up, supplied with power either by the primary device or by a battery, it starts to search for devices in the vicinity or public available communication infrastructure and connects to them as described in the previous chapters. If the auxiliary peripheral device is connected via an USB connection and shows up on the primary electronic device as a mass storage device any information written to this mass storage device could, in case of an already successful established connection, simply be transmitted via the alternate communication channel or be buffered until a connection attempt succeeds. In case an intermediary external device is used for an analog telephone, the device can be utilized by simply dialing its direct dial number. Any information transmitted to this device would then travel the alternate communication channel that was previously established by the auxiliary external device.

Although the invention has been described in relation to preferred embodiments, many variations, equivalents, modifications and other uses will become apparent to those skilled in the art. The scope of the present invention should not be limited to the specific disclosure but determined only by the appended claims.

What is claimed is:

1. A method, comprising:
   creating a communication layer via a primary device by incrementing a number representing at least one of a network address, a telephone number and a frequency;
   creating a connection request comprising the incremented number; and
   transmitting, via the primary device, the connection request onto the communication layer to a secondary device to produce at least one successful response.

2. The method of claim 1, wherein a primary communication channel operating in a wired or radio network is linked to an additional communication channel established by the at least one device.

3. The method of claim 2, wherein the primary communication channel has an interface compatible with at least one of:
   a Bluetooth device;
   a human interface device (HID) comprising interactive input devices that are operated by a system-supplied HID class driver, which comprises USB devices that comply with a USB HID Standard and non-USB devices that use a HID minidriver;
   an IEEE 1394 device;
   an IrDA device comprising serial-IR and fast-IR NDIS miniports;
   a multifunction device including combo cards comprising at least one of a PCMCIA modem and netcard adapter;
   a network adapter comprising NDIS NIC miniport drivers;
   a PCI SSL accelerator device that accelerates secure socket layer (SSL) cryptographic processing;
   a PCMCIA adapter including CardBus host controllers;

a port device including serial and parallel port devices;
a USB peripheral device; and
a Windows CE USB ActiveSync device that supports communication between a personal computer and a device that is compatible with the Windows CE ActiveSync driver over USB.

4. The method of claim 2, wherein the primary communication channel has an interface that uses a modem.

5. The method of claim 1, further comprising:
exchanging a set of predefined logon information with the at least one device; and
establishing a bridged connection and transmitting connection request packets according to the received logon information.

6. A method, comprising:
creating a communication layer via a primary device by incrementing a number representing at least one of a network address, a telephone number and a frequency;
creating a connection request comprising the incremented number; and
transmitting, via the primary device, the connection request onto the communication layer to a secondary device to produce at least one successful response.

7. The method of claim 6, wherein a primary communication channel operating in the wired or radio network is linked to an additional communication channel established by the at least one device.

8. The method of claim 6, further comprising:
exchanging a set of predefined logon information with the at least one device; and
establishing a bridged connection and transmitting connection request sequences according to the received logon information.

9. A non-transitory computer-readable storage medium having computer-executable instructions that when executed via a processor perform:
creating a communication layer via the primary device by incrementing a number representing at least one of a network address, a telephone number and a frequency;
creating a connection request comprising the incremented number; and
transmitting, via the primary device, the connection request onto the communication layer to a secondary device to produce at least one successful response.

10. The non-transitory computer-readable storage medium of claim 9, having further computer-executable instructions to perform:
linking a primary communication channel operating in the wired or radio network to an additional communication channel established by the at least one device.

11. The non-transitory computer-readable storage medium of claim 9, having further computer-executable instructions to perform:
exchanging a set of predefined logon information with the at least one device; and
establishing a bridged connection and transmitting connection request packets according to the received logon information.

12. A non-transitory computer-readable storage medium having computer-executable instructions that when executed via a processor perform:
creating a communication layer via the primary device by incrementing a number representing at least one of a network address, a telephone number and a frequency;
creating a connection request comprising the incremented number; and
transmitting, via the primary device, the connection request onto the communication layer to a secondary device to produce at least one successful response.

13. The non-transitory computer-readable storage medium of claim 12, having further computer-executable instructions to perform:
linking a primary communication channel operating in the wired or radio network to an additional communication channel established by the at least one device.

14. The non-transitory computer-readable storage medium of claim 12, having further computer-executable instructions to perform:
exchanging a set of predefined logon information with the at least one device; and
establishing a bridged connection and transmitting the connection request sequences according to the received logon information.

15. A device, comprising:
at least one processor that, when loaded with computer-readable instructions, executes the instructions to:
create a communication layer via the primary device by a number being incremented representing at least one of a network address, a telephone number and a frequency;
create a connection request comprising the incremented number; and
transmit, via the primary device, the connection request onto the communication layer to a secondary device to produce at least one successful response.

16. The device of claim 15, wherein the primary communication channel is linked to the additional communication channel.

17. The device of claim 15, wherein the processor is further configured to exchange a set of predefined logon information and establish a bridge connection and transmit a connection request packet according to the received logon information.

18. A device, comprising:
at least one processor that, when loaded with computer-readable instructions, executes the instructions to:
create a communication layer via the primary device by a number being incremented representing at least one of a network address, a telephone number and a frequency;
create a connection request comprising the incremented number; and
transmit, via the primary device, the connection request onto the communication layer to a secondary device to produce at least one successful response.

19. The device of claim 18, wherein the primary communication channel is linked to the additional communication channel.

20. The device of claim 18, wherein the processor is further configured to exchange a set of predefined logon information and establish a bridge connection and transmit the connection request sequences according to the received logon information.

* * * * *